(12) United States Patent
Chen et al.

(10) Patent No.: US 7,816,056 B2
(45) Date of Patent: Oct. 19, 2010

(54) STRUCTURE OF FUEL CELL ASSEMBLY

(75) Inventors: Charn-Ying Chen, Tao-Yuan (TW);
Chih-Yuan Hsu, Shu-Lin (TW);
Chih-Lin Huang, Taipei (TW); Peng Yang, Kaohsiung (TW); Yun-Bor Lin, Yang-Mei Town (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 1111 days.

(21) Appl. No.: 11/498,895

(22) Filed: Aug. 4, 2006

(65) Prior Publication Data
US 2008/0032180 A1 Feb. 7, 2008

(51) Int. Cl.
*H01M 8/02* (2006.01)
(52) U.S. Cl. ...................................................... 429/512
(58) Field of Classification Search .................. 429/38, 429/39, 40
See application file for complete search history.

(56) References Cited

U.S. PATENT DOCUMENTS

| | | | |
|---|---|---|---|
| 2004/0091765 A1* | 5/2004 | Lee et al. ...................... | 429/38 |
| 2004/0115503 A1* | 6/2004 | Jacobson et al. .............. | 429/34 |
| 2005/0181266 A1* | 8/2005 | Sasahara et al. .............. | 429/39 |
| 2005/0196666 A1* | 9/2005 | Gottesfeld et al. .......... | 429/127 |
| 2005/0249996 A1* | 11/2005 | Meacham ..................... | 429/35 |
| 2006/0121331 A1* | 6/2006 | Hu et al. ....................... | 429/38 |
| 2007/0275289 A1* | 11/2007 | Krothapalli .................. | 429/38 |

* cited by examiner

*Primary Examiner*—Patrick Ryan
*Assistant Examiner*—Muhammad Siddiquee
(74) *Attorney, Agent, or Firm*—Rosenberg Klein & Lee

(57) ABSTRACT

A structure of fuel cell assembly is disclosed. A flow channel plate with a plurality of flow fields is respectively disposed on two sides of a fuel cell unit. A plurality of graphic electrodes is arranged on two sides of the fuel cell unit and the flow field matches the graphic electrodes. Thus water generated from reaction of the fuel cell is removed and further reduction of the performance of the fuel cell is avoided. Moreover, fuel is distributed more uniformly over reaction area of the cell. And the number of fuel cells stacked per unit volume is increased. Therefore, the efficiency of the fuel cell is improved.

16 Claims, 17 Drawing Sheets

STRUCTURE OF FUEL CELL ASSEMBLY

BACKGROUND OF THE INVENTION

The present invention relates to a stack, especially to a structure of fuel cell assembly.

There are limited resources on the earth. Under the condition that the population density keeps increasing, the resources available for the individual are decreasing dramatically day after day. Moreover, fast development of industries as well as overexploitation of resources leads to over-consumption of energy. The earth is getting worse for people to live on. Thus besides higher efficiency, energy technology further got to have advantage of low pollution. The fuel cell technology is becoming increasingly popular in power generation technology that matches these requirements.

Refer to FIG. 1 & FIG. 2, respectively are explosive view and perspective view of a stacked fuel cell set disclosed in Taiwanese patent No. 237920. As shown in figure, a conventional fuel cell includes a plate for flow fields 10, two fuel cell units 20 and a locking member. The two fuel cell units 20 are disposed on two sides of the plate for liquid channels 10. The plate for liquid channels 10 consists of a fuel inlet 11 and a flow field 13, connecting with each other for drawing liquid fuel. The locking member is composed of a first part 32, a second part 34 and a plurality of openings 36, respectively arranged outside the two fuel cell units 20 so that the fuel cell units 20 contact and reacts with air from outside through the openings 36 for generating electricity.

Refer to FIG. 3, the fuel cell unit 20 is a proton exchange membrane fuel cell that includes a netty metal plate 22 and a membrane electrode assembly 24.

The netty metal plate 22 is made by drawing of metal sheet or knitted metal mesh and having a first netty area 222 and a second netty area 224. The membrane electrode assembly 24 is disposed on the second netty area 224. The membrane electrode assembly 24 consists of an anode catalyst layer 242, a proton exchange membrane 244 and a cathode catalyst layer 246. The anode catalyst layer 242 and the cathode catalyst layer 246 are respectively arranged on two sides of the proton exchange membrane 244. The anode catalyst layer 242 is arranged on the second netty area 224.

In order to make the fuel cell work, the fuel is intake through the inlet 11 and the fuel cell unit 20 is a proton exchange membrane fuel cell. The fuel can be aqueous methanol solution made by water mixed with methyl alcohol. When the aqueous methanol solution is filled into the flow field 13 through the fuel inlet 11, it's oxidized at the anode catalyst layer 242 to generate positive hydrogen ions negative electrons and carbon dioxide. The hydrogen ions are transferred through the proton exchange membrane with high ionic conductivity and the high selective permeability to the cathode catalyst layer 246 while electrons are transferred through metal plate 22 of the fuel cell unit 20, loadings of the fuel cell unit 20 and then to the cathode catalyst layer 246. At the cathode catalyst layer 246, the hydrogen ions from the anode combine with the electrons and oxygen from air to produce water.

Water is mostly a problem on the cathode side of the fuel cell because it blocks reaction area of the fuel cell. Thus the hydrogen ions and the electrons at the cathode catalyst layer 246 can't react with oxygen in the air. Therefore, efficiency of reaction area of the fuel cell is reduced. A cooling fan is used to accelerate vaporization of water as well as velocity of air flow so that the cathode catalyst layer 246 contacts with more oxygen and further efficiency of the reaction area is improved. But such way still can't make water volatilize quickly. Thus water may still form a barrier at the cathode catalyst layer 246.

Thus the present invention provides a structure of fuel cell assembly that discharges water quickly so as to avoid reduced performance caused by water accumulation. Moreover, fuel is distributed more uniformly over reaction area of the fuel cell to overcome above shortcomings.

SUMMARY OF THE INVENTION

Therefore it is a primary object of the present invention to provide a structure of fuel cell assembly that carries out water generated from reaction of the fuel cell by a flow channel plate so as to make fuel distribute more uniformly over reaction area of the cell. Therefore, efficiency and conversion rate of the fuel cell are improved.

It is another object of the resent invention to provide a structure of fuel cell assembly that reduces volume of a structure of fuel cell assembly and increases the number of fuel cells stacked per unit volume. Thus efficiency of the fuel cell is increased.

In order to achieve above objects, the present invention consists of a first flow channel plate, a fuel cell set, and a second flow channel plate. The first flow channel plate and the second flow channel plate respectively includes a plurality of flow fields, a flow inlet and a flow outlet while the flow field connects the flow inlet with the flow outlet. The fuel cell set with a plurality of graphic electrodes on two sides thereof is sandwiched between the first and the second flow channel plates. The flow field matches the graphic electrode. In another embodiment of the present invention, a structure of fuel cell assembly includes a first flow channel plate, a first fuel cell set, a flow field plate, a second fuel cell set, and a second flow channel plate. The first flow channel plate and the second flow channel plate respectively includes a plurality of flow fields, a flow inlet and a flow outlet while the flow field connects the flow inlet with the flow outlet. The first fuel cell set and the second fuel cell set respectively with a plurality of graphic electrodes on two sides are disposed between the first flow channel plate and the second flow channel plate while the flow field plate is sandwiched between the first fuel cell set and the second fuel cell set. A flow field that connects an inlet and an outlet is arranged on each of two sides of the flow filed plate. The flow fields on the flow filed plate and on the flow channel plate match the graphic electrodes. Or the flow field plate is replace by a bipolar plate. Two sides of the bipolar plate are disposed with a plurality of flow fields, a flow inlet, and a flow outlet while the flow field connects the flow inlet with the flow outlet. Therefore, water generated from reaction of the fuel cell is removed through the flow channel plate so as to make the fuel distribute more uniformly over reaction area of the fuel cell and water won't reduce performance and efficiency of the fuel cell.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
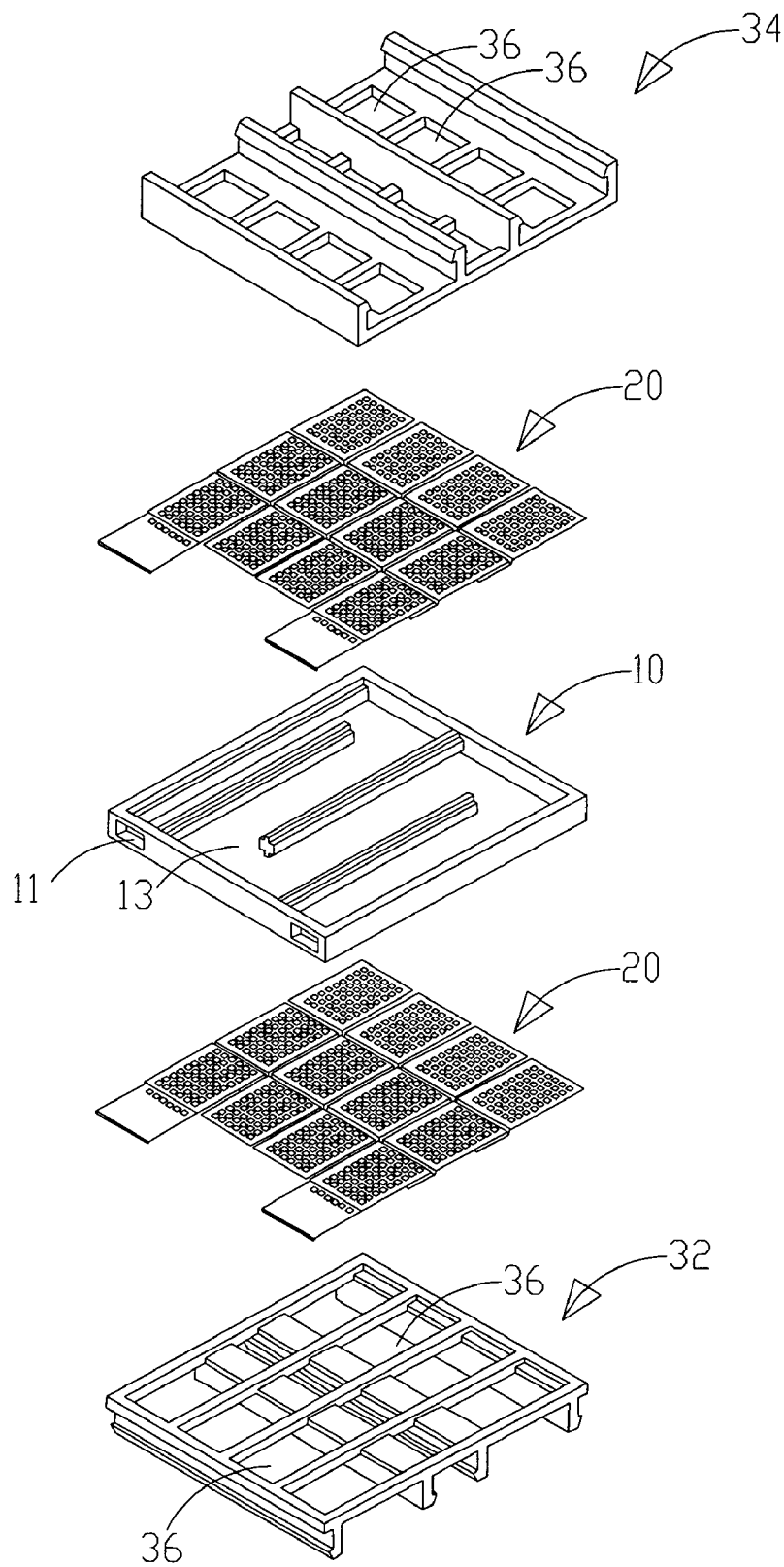
FIG. 1 is an explosive view of a conventional stacked fuel cell set according to a prior art.
Figure 2:
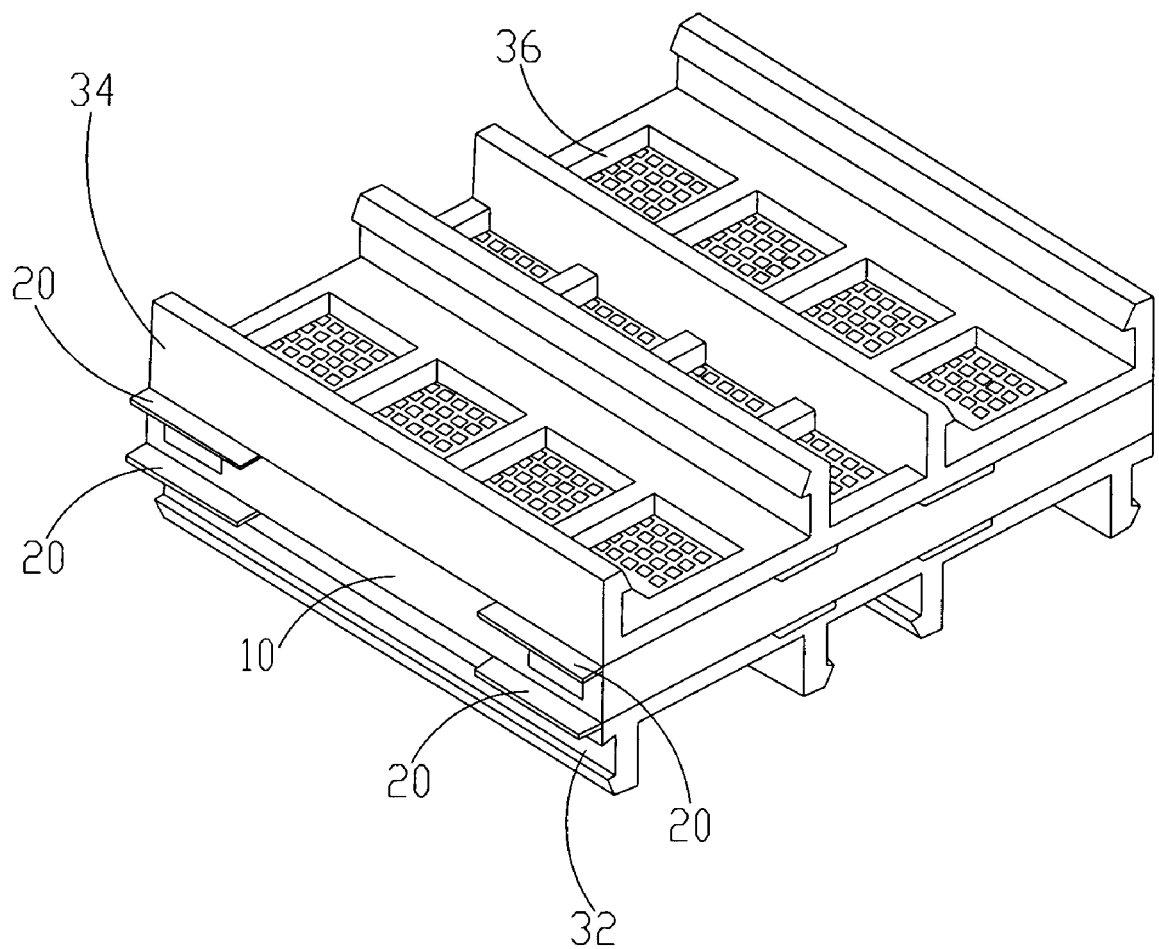
FIG. 2 is a perspective view of a conventional stacked fuel cell set according to a prior art.
Figure 3:
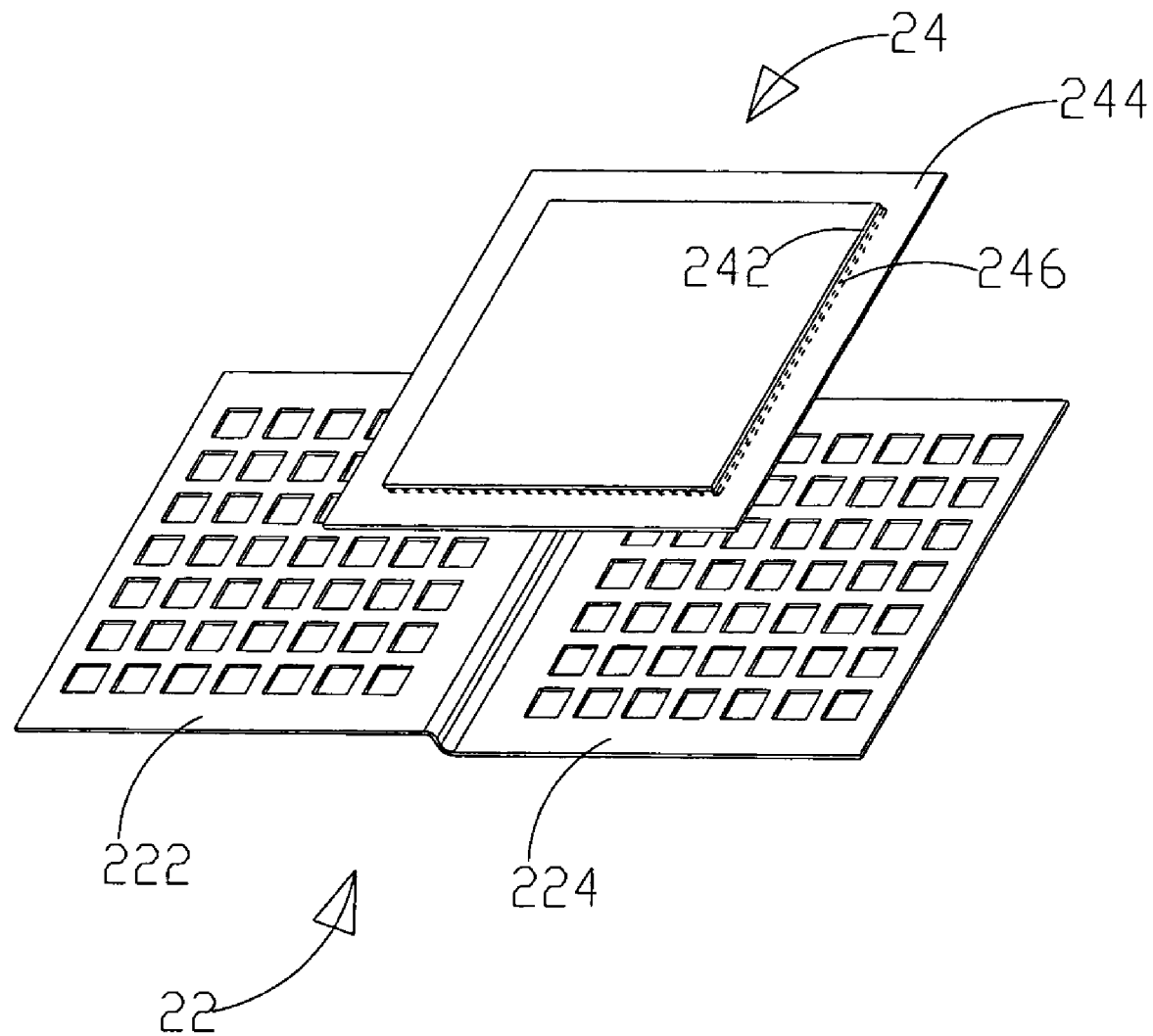
FIG. 3 is a schematic drawing of a fuel cell unit according to a prior art.
Figure 4:
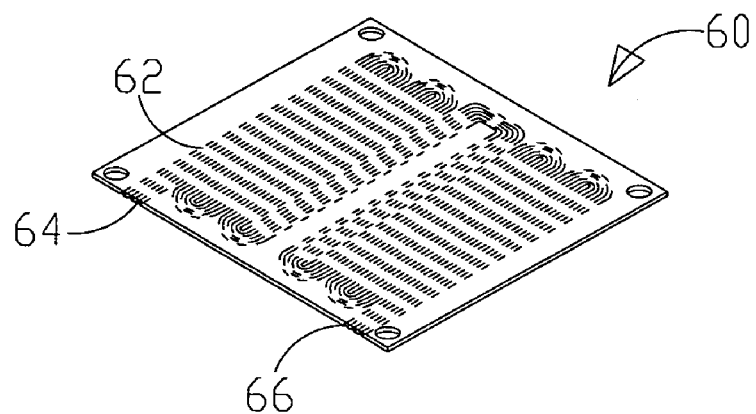
FIG. 4 is an explosive view showing a structure of fuel cell assembly of an embodiment according to the present invention.
Figure 4:
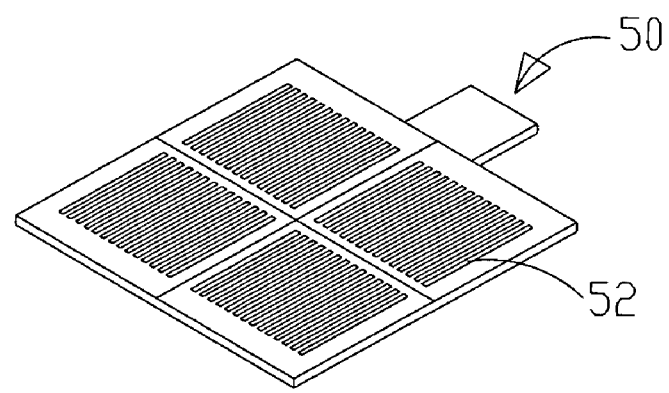
Figure 4:
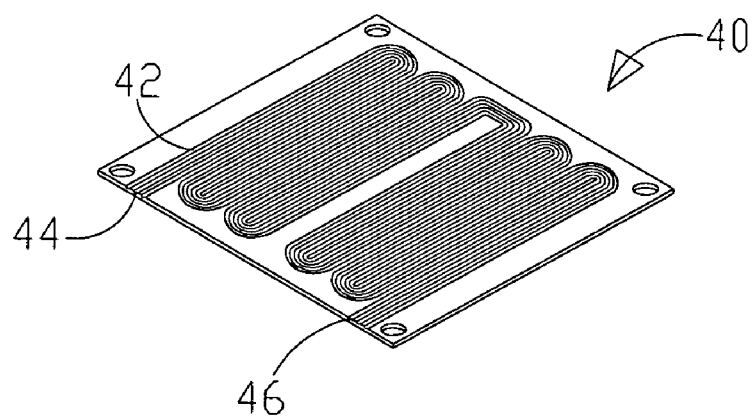

Refer to FIG. 4, a fuel cell according to the present invention consists of a first flow channel plate 40, a fuel cell set 50 and a second flow channel plate 60. The first flow channel plate 40 is disposed with a plurality of flow fields 42, a flow inlet 44 and a flow outlet 46. The flow fields 42 connect the flow inlet 44 with the flow outlet 46 and the fuel cell set 50 is disposed over the first flow channel plate 40. At least one graphic electrode 52 is disposed on each of the two sides of the fuel cell set 50 respectively. The second flow channel plate 60 including a plurality of flow fields 62, a flow inlet 64 and a flow outlet 66 are arranged over the fuel cell set 50. The flow fields 62 connect the flow inlet 64 with the flow outlet 66 and shape of the flow field 62 is designed in combination with the graphic electrode 52.

For operation of the fuel cell of the present invention, air or oxygen is input into the device through the flow inlet 44 and is output through the flow outlet 46 while fuel is input through the device through the flow inlet 64 and is output through the flow outlet 66. The fuel can be methanol, alcohol solution or fuel that's rich in hydrogen. Moreover, the fuel can be input into the device through the flow inlet 44 and is output through the flow outlet 46 while air or oxygen can be input through the device through the flow inlet 64 and is output through the flow outlet 66. The inlet for fuel, air or oxygen can be chosen according to users' needs.

Figure 5A:
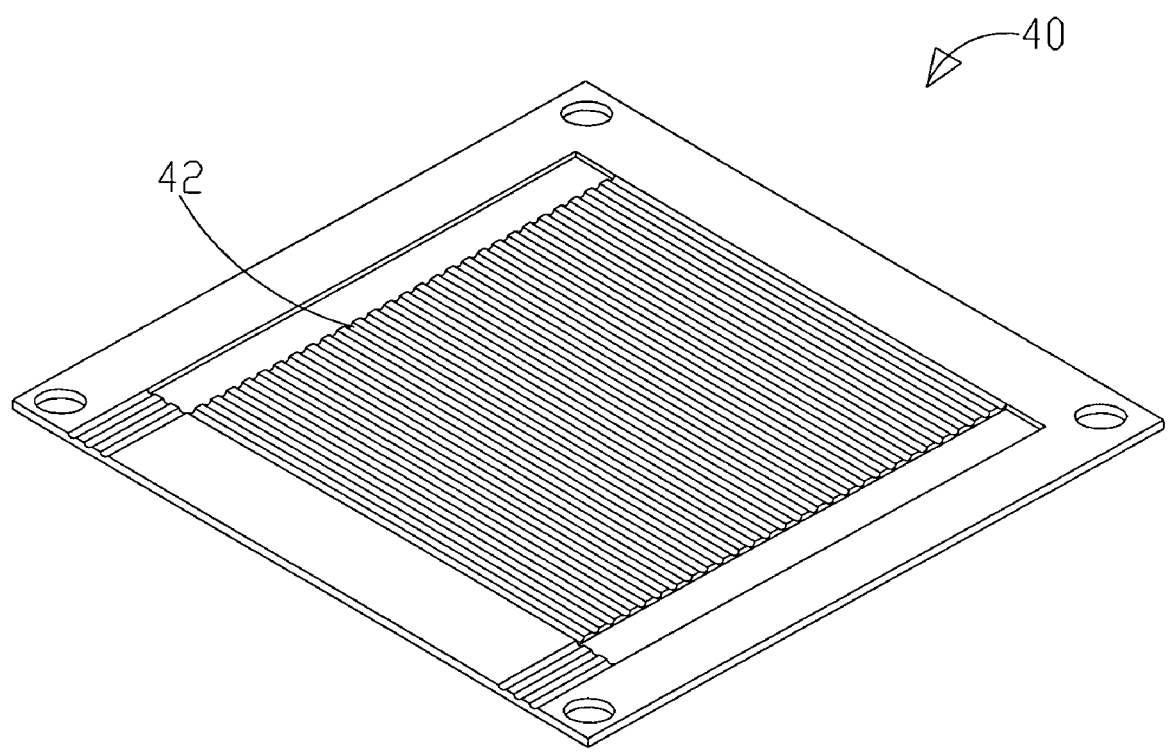
FIG. 5A is a schematic drawing showing a flow field of a flow channel plate of an embodiment according to the present invention.
Figure 5B:
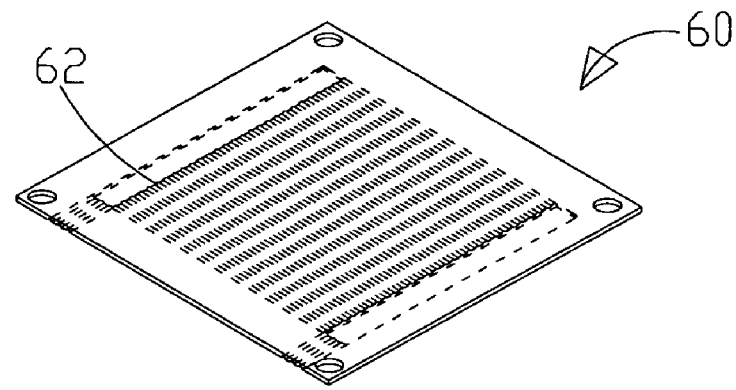
FIG. 5B is a schematic drawing showing a graphic electrode of another embodiment according to the present invention.
Figure 5B:
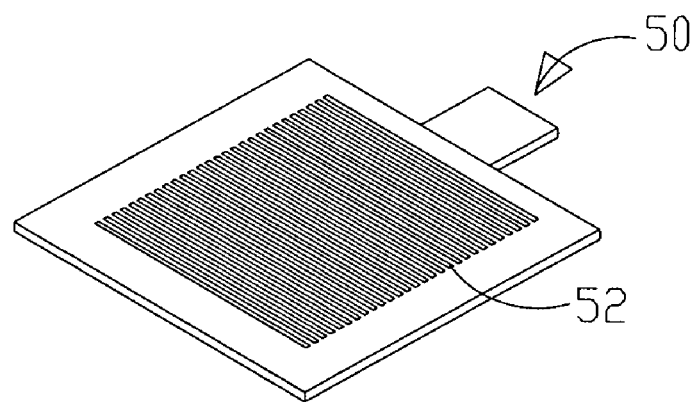
Figure 5B:
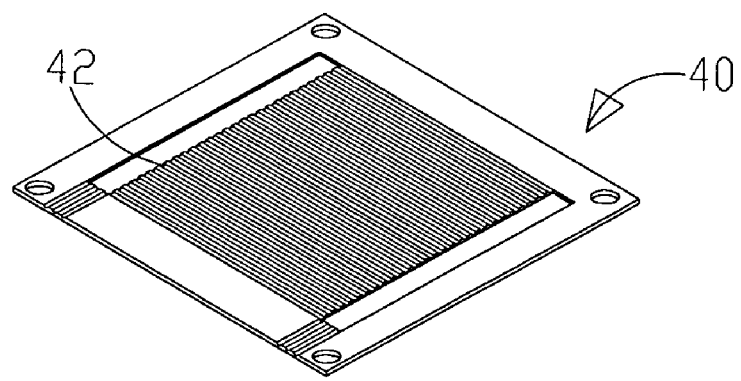

Refer to FIG. 5A & FIG. 5B, the flow field 42 of the first flow channel plate 40 can be a pin-type flow field and shape of the graphic electrode 52 of the fuel cell set 50 matches shape of the flow field 42. Furthermore, the flow field 62 of the second flow channel plate 60 can also be a pin-type flow field or flow field in other forms and shape of the graphic electrode 52 of the fuel cell set 50 also matches shape of the flow field 62.

Figure 5C:
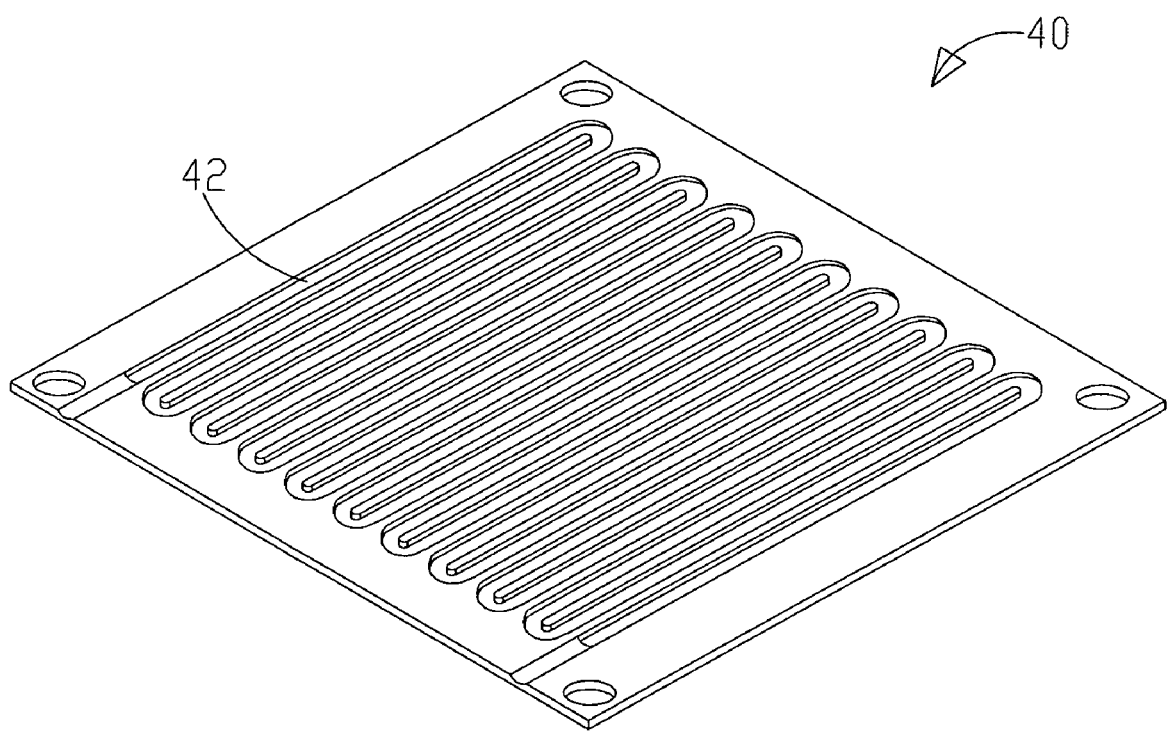
FIG. 5C is a schematic drawing showing a flow field of a flow channel plate of another embodiment according to the present invention.

Refer to FIG. 5C, a flow filed of the flow channel plate is disclosed. The difference between this embodiment and above one is in that the flow filed 42 of this embodiment is a serpentine flow field. Moreover, the shape of the graphic electrode 52 matches the shape of the flow filed 42 or the flow filed 62. Therefore, fuel is distributed more uniformly over reaction area of the stacked fuel cell.

Figure 6:
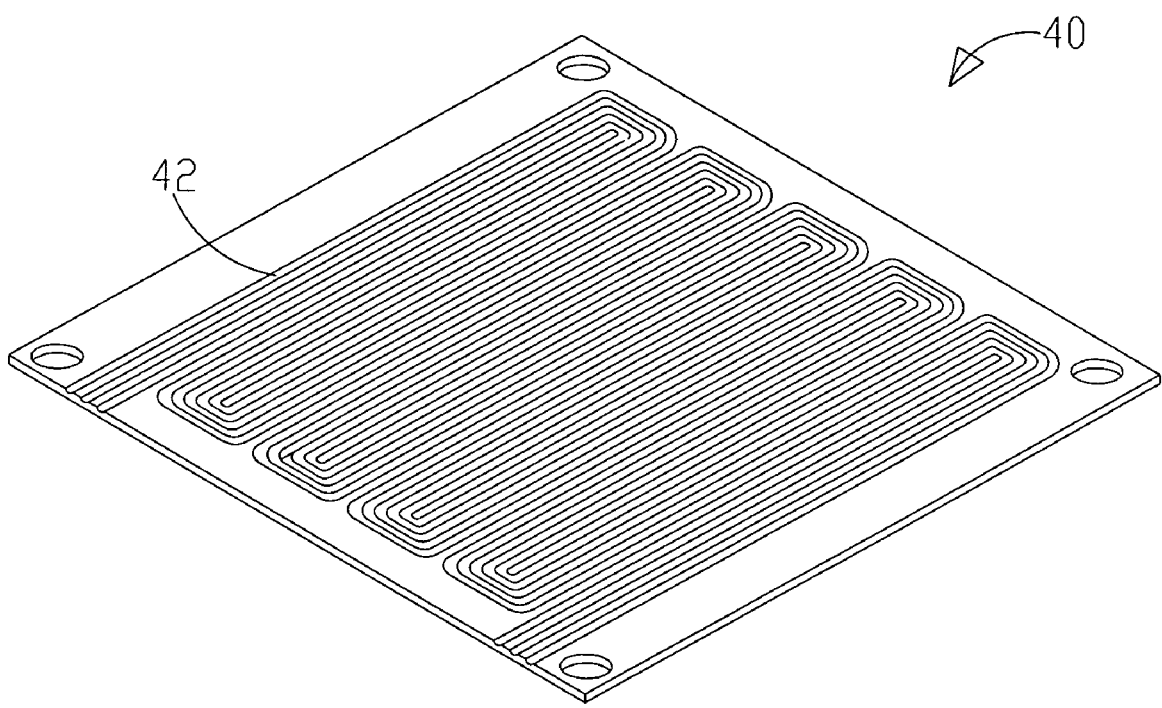
FIG. 6 is a schematic drawing showing a flow field of a flow channel plate of a further embodiment according to the present invention.

With reference of FIG. 6, another flow field of the flow channel plate is disclosed. The difference between this embodiment and above one is in that the flow filed 42 of this embodiment is not only a serpentine flow field while turning area of the serpentine flow field is rectangular. Moreover, the serpentine flow field in this embodiment is a flow filed 42 that is thinner and arranged in parallel. Thus fuel is distributed more uniformly over reaction area of the stacked fuel cell. Also water is difficult to accumulate inside the flow filed 42. Therefore, the drainage capacity of the fuel cell is improved.

Figure 7:
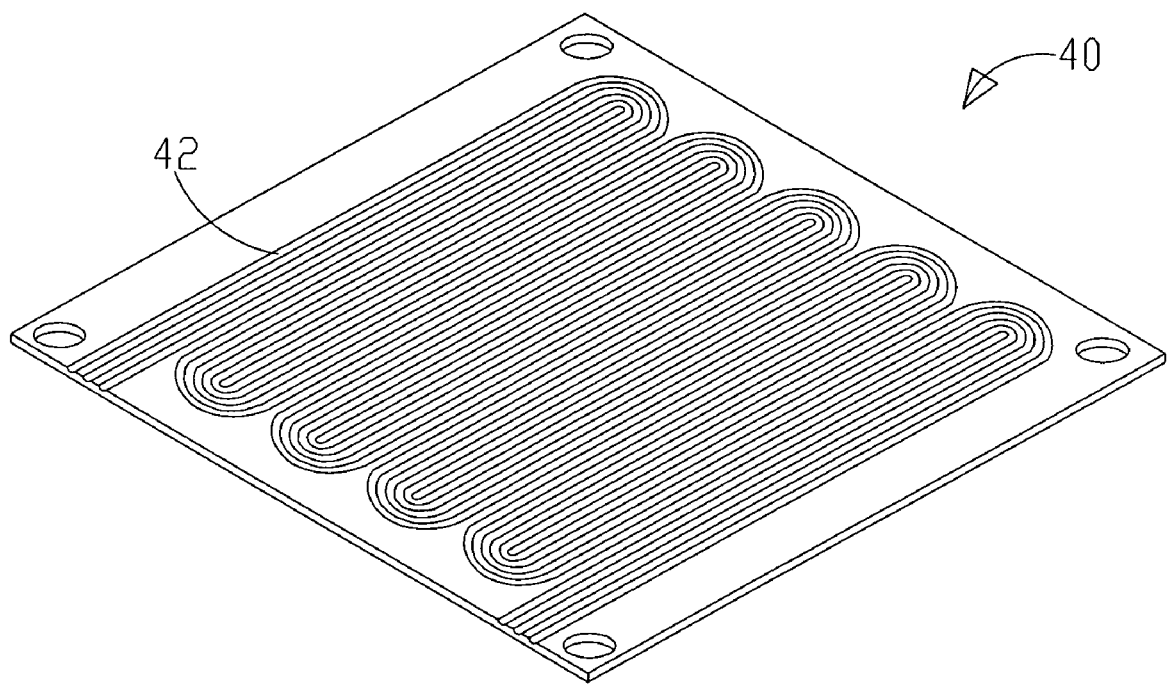
FIG. 7 is a schematic drawing showing a flow field of a flow channel plate of a further embodiment according to the present invention.

Refer to FIG. 7, a further flow field of flow channel plate is disclosed. The difference between this embodiment and above one is in that the turning area of the serpentine flow field is arched so as to avoid pressure loss of the flow field 42 and water is difficult to accumulate inside the flow field 42 so that the drainage capacity of the fuel cell is increased. In accordance with above description, it is learned that the flow field 42 and flow field 62 can be respectively a serpentine flow field and a pin-type flow field, or both are serpentine flow fields or pin-type flow field. Once the shape of the flow field 42 or flow field 62 matches the shape of the graphic electrode 52, the fuel cell works more efficiently.

Figure 8:
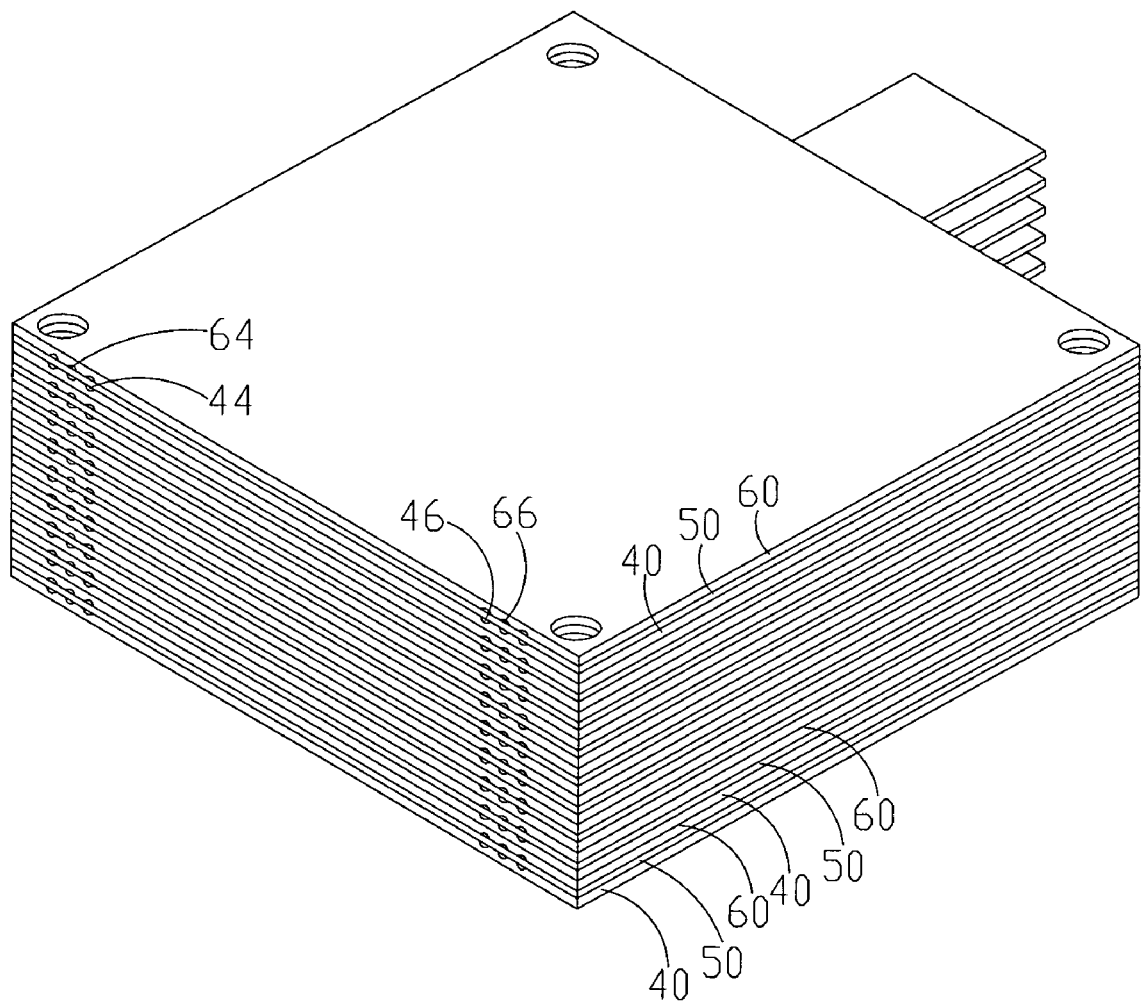
FIG. 8 is a perspective view showing a structure of fuel cell assembly of an embodiment according to the present invention.
Figure 9A:
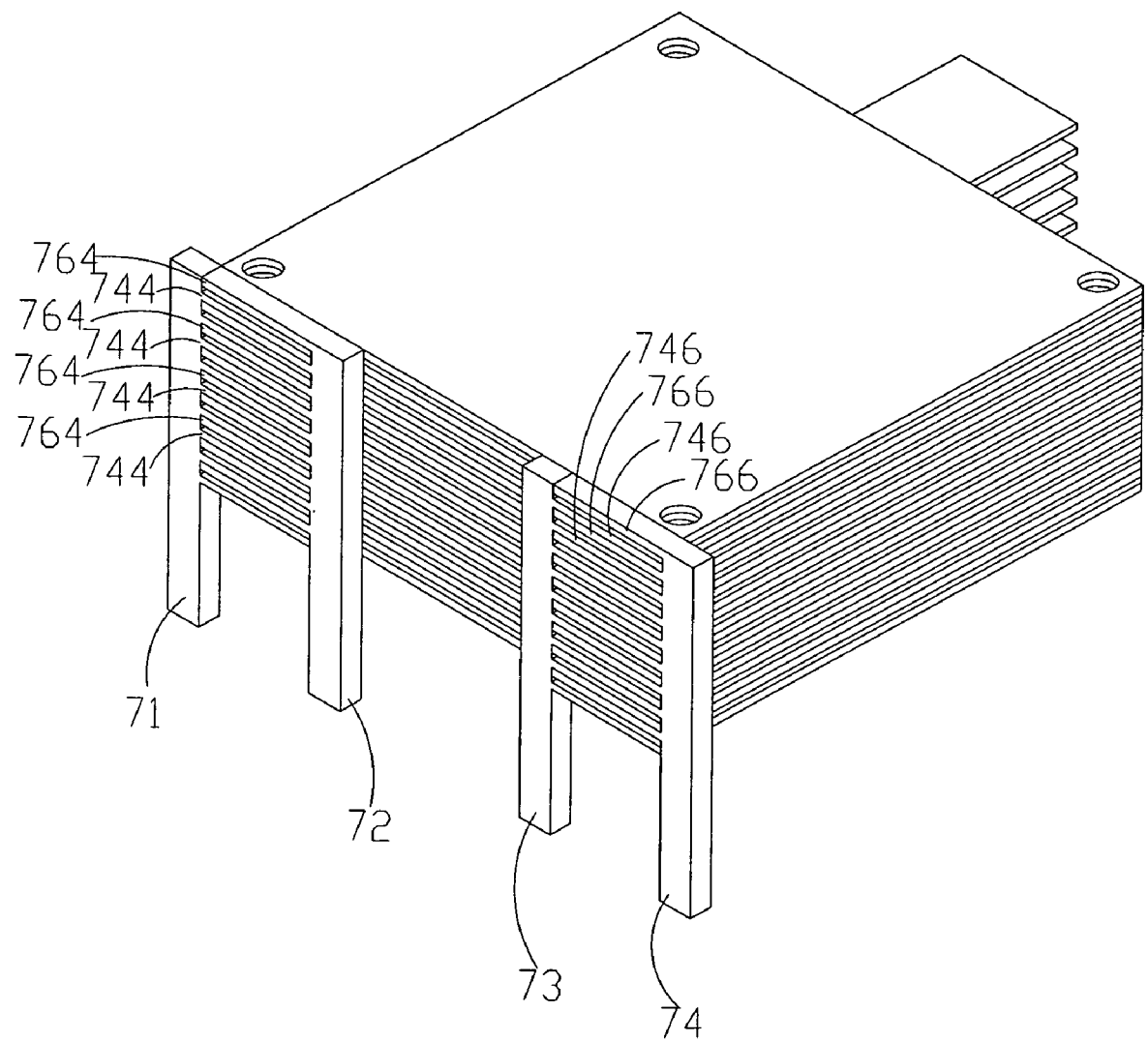
FIG. 9A is a perspective view of a flow pipe of an embodiment according to the present invention.

Refer to FIG. 8 & FIG. 9A, after the first flow channel plate 40, the fuel cell set, and the second flow channel plate 60 being assembled, the fuel cell is stacked one after another. In a structure of fuel cell assembly, a plurality of flow pipes 744, 746 are respectively disposed on each of the flow inlets 44 and the flow outlets 46 for convenience of use, so as a plurality of flow pipes 764, 766 on each of the flow inlets 64 and the flow outlets 66. Each of the flow pipes 744 are connected with one another by a manifold 71 and each of the flow pipes 764 are connected with one another by a manifold 72. In similar way, each of the flow pipes 746 are connected with one another by a manifold 73 and each of the flow pipes 766 are connected with one another by a manifold 74. The manifold 71 is a tube for air or oxygen intake and the manifold 72 is a tube for fuel intake while the manifold 73 is a tube for air or oxygen exhaust and the manifold 74 is a tube for fuel exhaust.

Figure 9B:
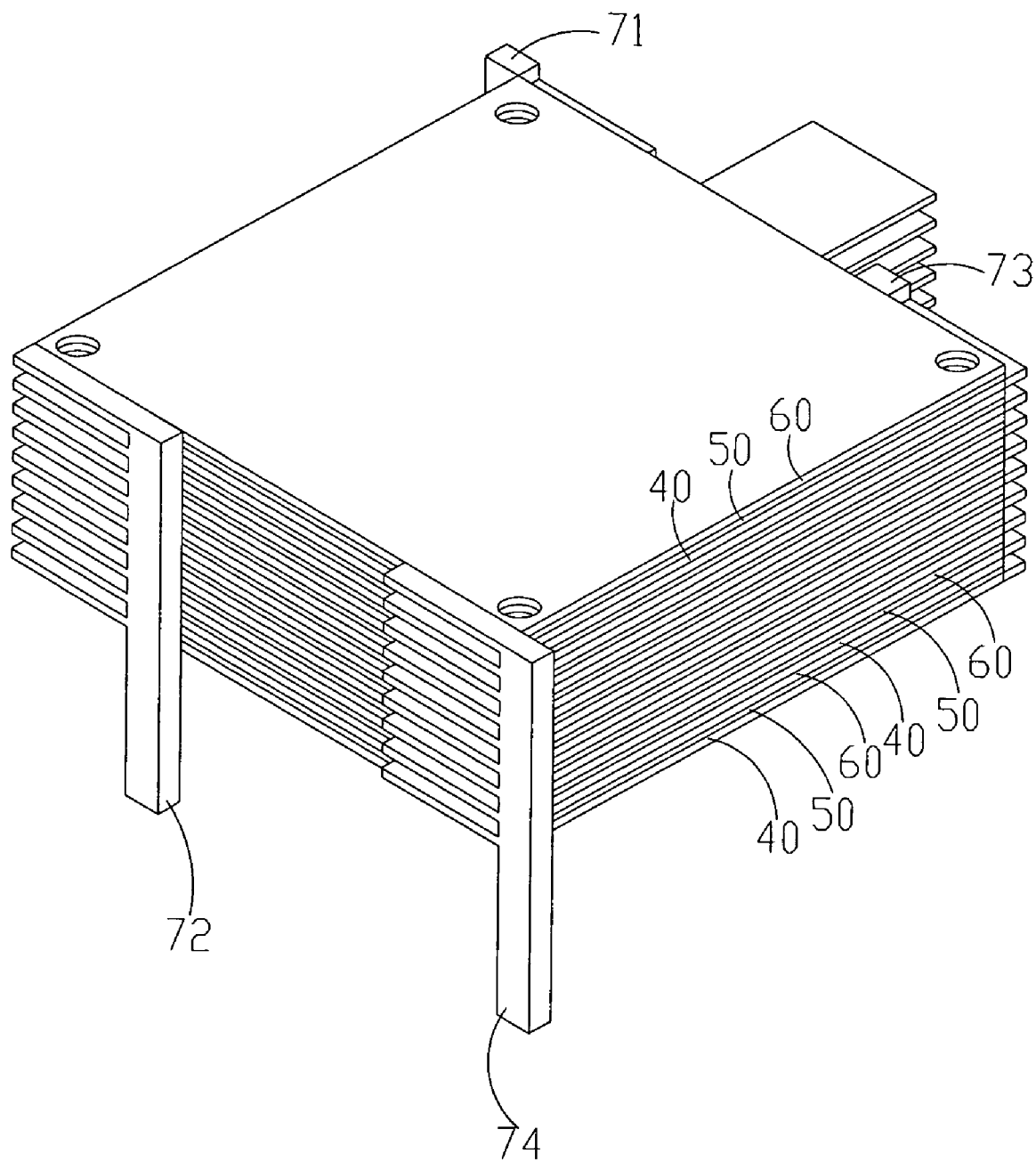
FIG. 9B is a perspective view of a flow pipe of another embodiment according to the present invention.

Refer to FIG. 9B, the difference between this embodiment and the one in FIG. 9A is in that the inlets 44, 64 and the outlets 46, 66 of the embodiment in FIG. 9A are located on the same side of the device while the inlets 44, 64 and the outlets 46, 66 of the embodiment in FIG. 9B are located on different sides so that the manifold 71 and the manifold 73 are on the same side, the manifold 72 and the manifold 74 are also one the same side but the manifold 71 and the manifold 72 are on different sides.

Figure 10:
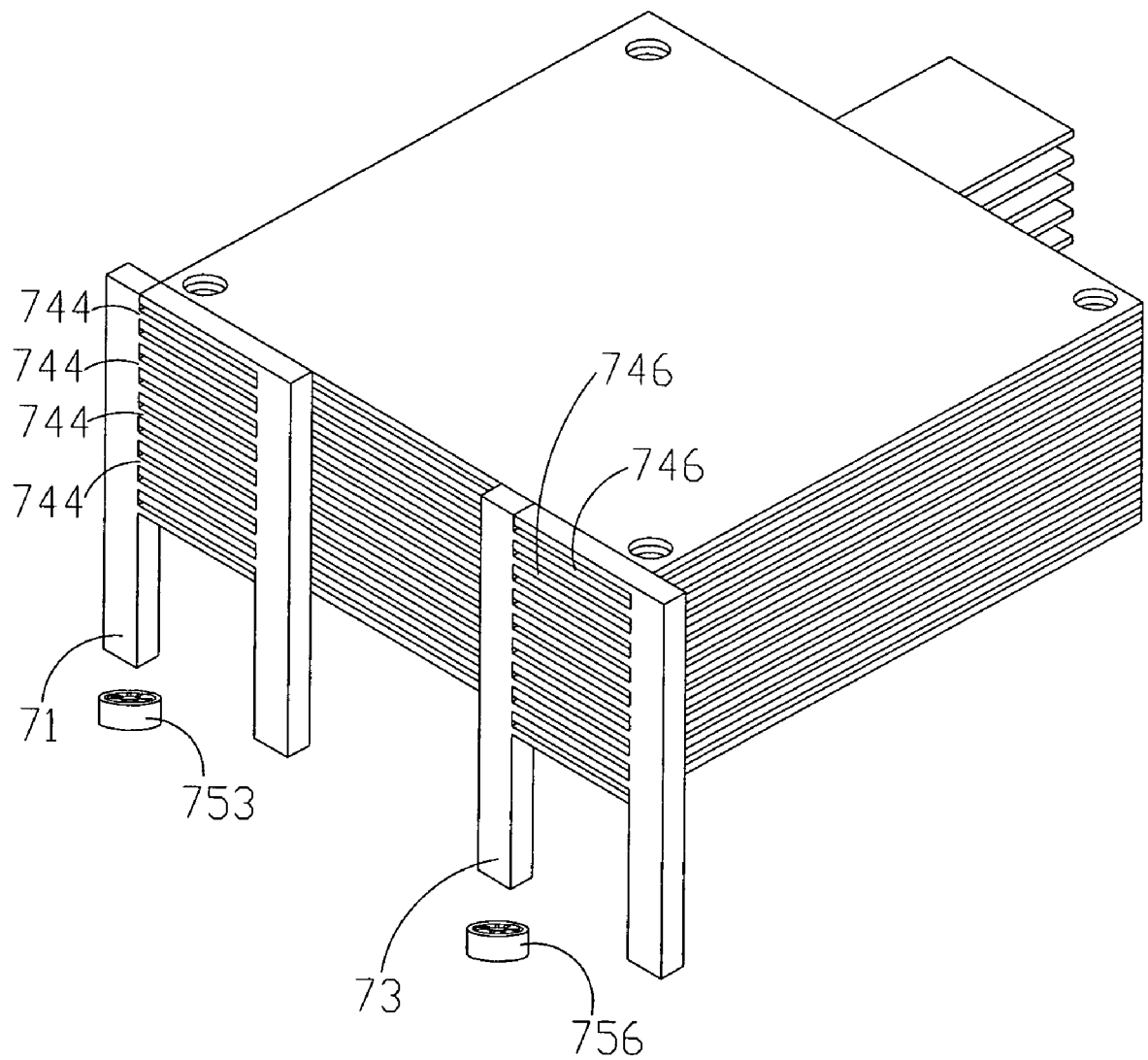
FIG. 10 is a perspective view showing a fan disposed on a flow pipe.

Refer to FIG. 10, for accelerating water vaporization and air flow, flow pipes 744, 748 are respectively connected with a fan 75. For convenience of assembly, the fan 75 can be disposed on the manifold 71 or the manifold 73. In this embodiment, the manifold 71 is an air or oxygen inlet. The fan 75 is disposed on lower part of the manifold 71 for increasing input speed of air or oxygen. Or the fan 75 is disposed on lower part of the manifold 73 for increasing exhaust speed of air or oxygen so as to increase efficiency of the structure of fuel cell assembly. The fan 75 is used in this embodiment while it can be replaced by blowers or pumps.

Figure 11:
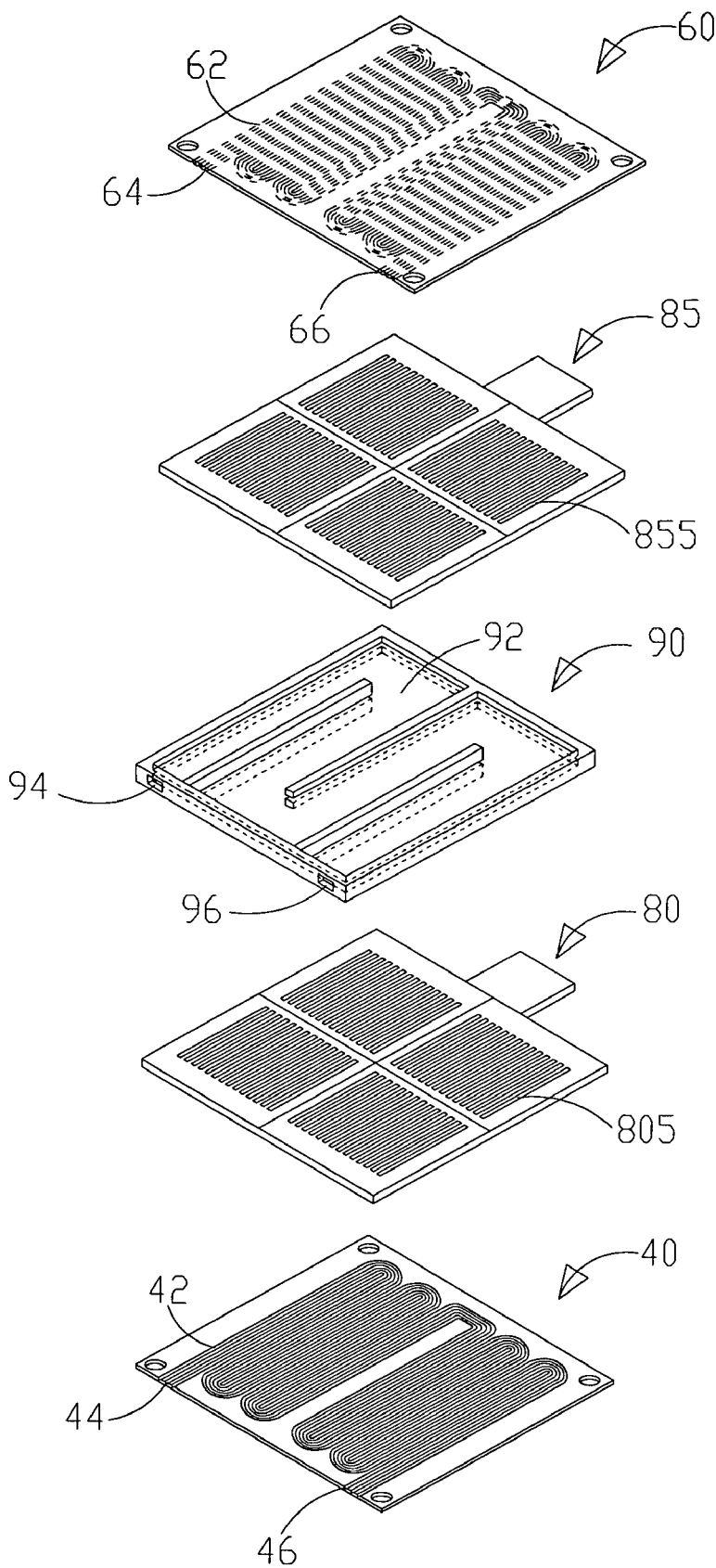
FIG. 11 is an explosive view showing a structure of fuel cell assembly of another embodiment according to the present invention.

Refer to FIG. 11, the difference between this embodiment and the one in FIG. 4 is in that the structure of fuel cell assembly includes a first fuel cell set 80, a second fuel cell set 85 and a flow field plate 90 disposed between the two fuel cell sets 80, 85. The flow field plate 90 has an inlet 94, an outlet 96, and a flow filed 92 on two sides respectively that connects the inlet 94 with the outlet 96. At least one graphic electrode 805 is arranged on each of two sides of the first fuel cell set 80 and at least one graphic electrode 855 is disposed on each of two sides of the second fuel cell set 85, with. The shape of the flow fields 42, 62 matches the shape of the graphic electrodes 805, 855, so does the flow field 92. Therefore, when fuel is in through the inlet 94 and is out through the outlet 96, the fuel is distributed over the flow filed 92 on two sides of the flow field plate 90. Thus the flow channel plates 40, 60 are used for air or oxygen intake. On the other hand, once air or oxygen in intake through the inlet 94 and is exhausted through the outlet 96, the flow channel plates 40, 60 are used for input fuel. Thus the two fuel cells are connected in parallel.

Figure 12:
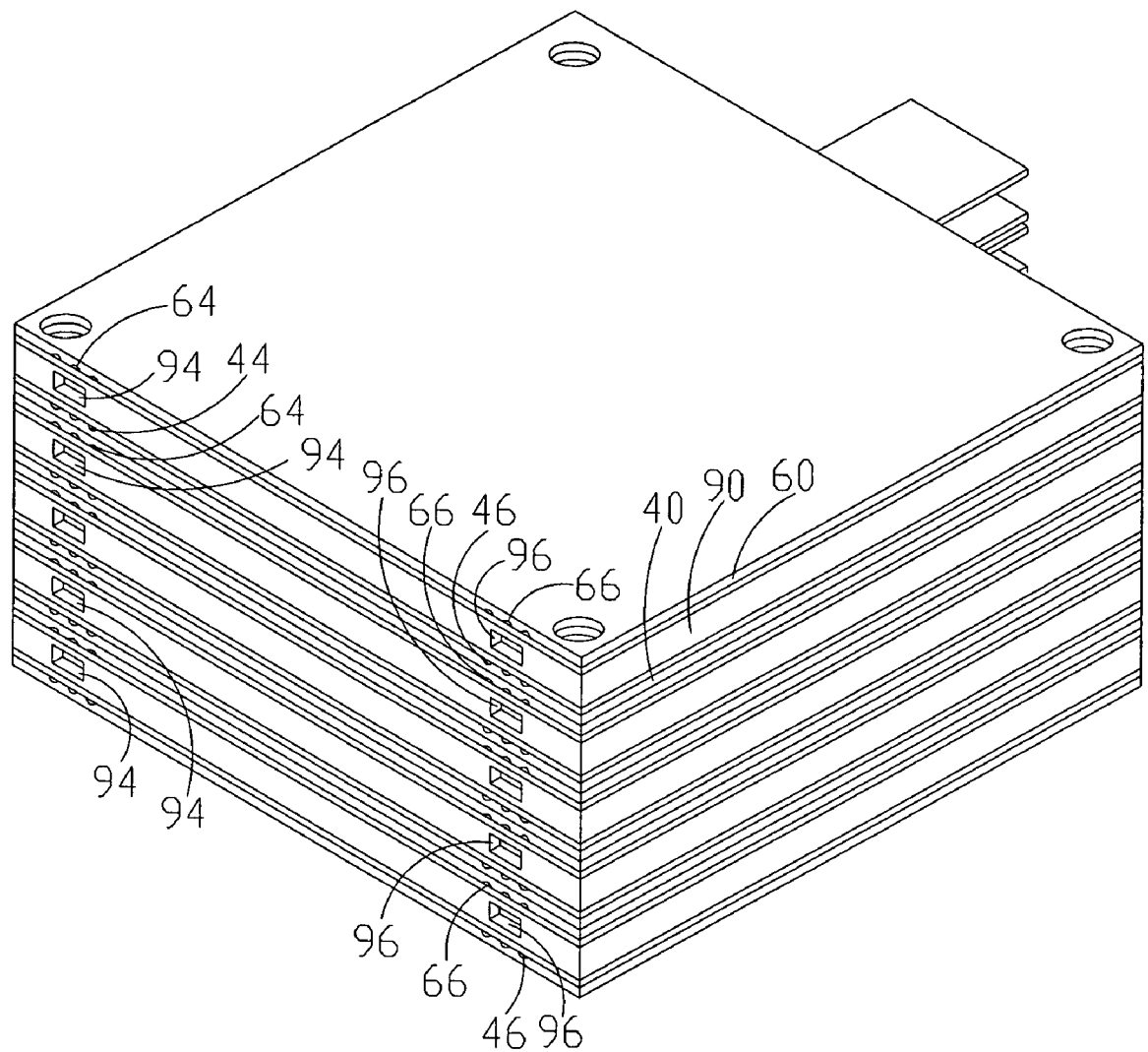
FIG. 12 is a perspective view showing a structure of fuel cell assembly of another embodiment according to the present invention.
Figure 13:
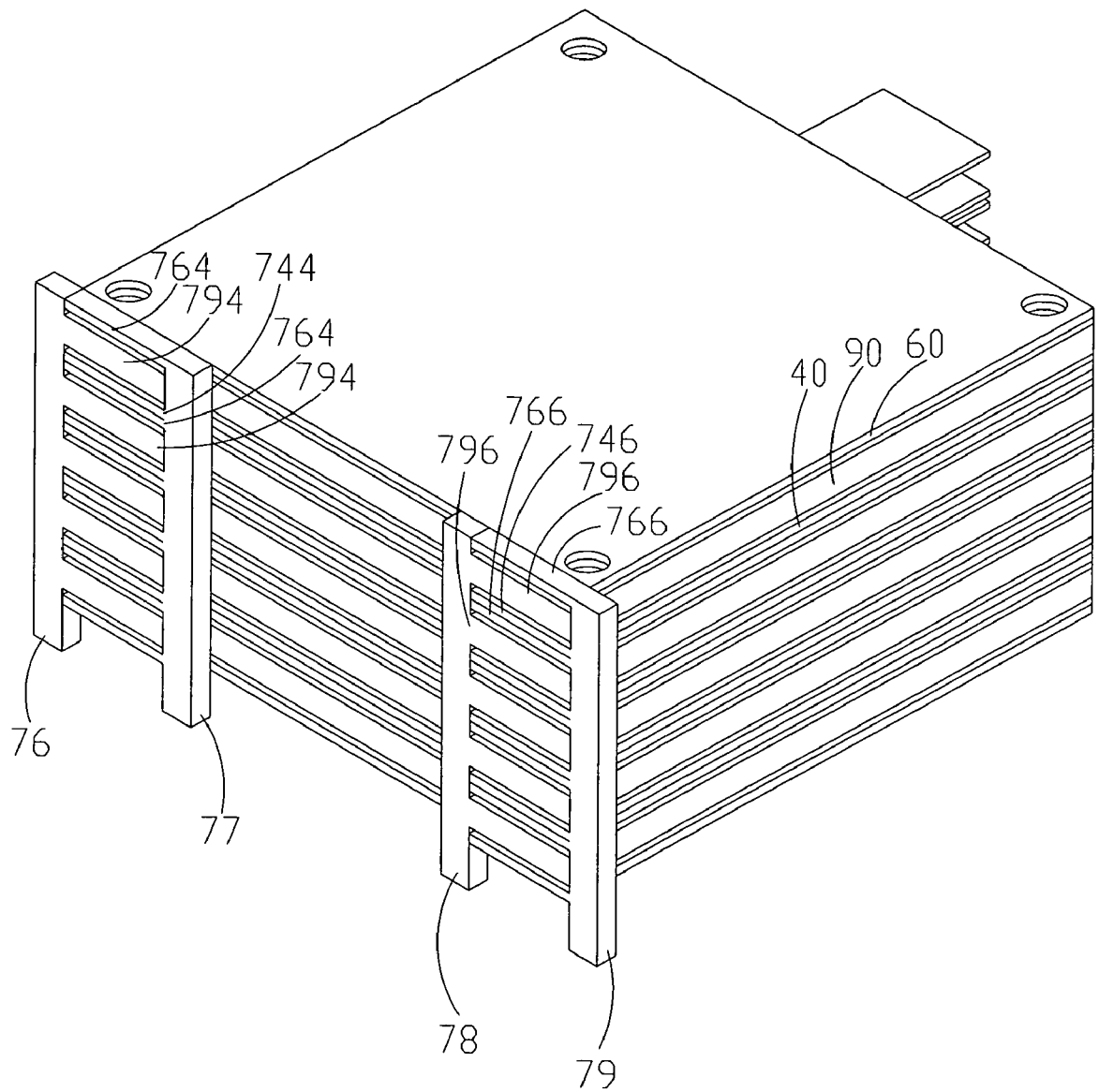
FIG. 13 is a perspective view of a flow pipe of another embodiment according to the present invention.

Refer to FIG. 12 & FIG. 13, the fuel cells are stacked for convenience of use. The way that fuel cells stack with one another and the flow pipes connect with one another is the same with the embodiment in FIG. 8 & FIG. 9. A plurality of flow pipes 744, 746 are respectively disposed on each of the flow inlets 44 and the flow outlets 46, a plurality of flow pipes 764, 766 are respectively disposed on each of the flow inlets 64 and the flow outlets 66, so as a plurality of flow pipes 794, 796 on each of the flow inlets 94 and the flow outlets 96. Each of the flow pipes 794 are connected with one another by a manifold 76 and each of the flow pipes 744, 764 are connected with one another by a manifold 77. Similarly, a manifold 78 connects each of the flow pipes 796 with one another while a manifold 79 connects each of the flow pipes 746, 766 with one another. Moreover, the manifold 76 is a tube for air intake, the manifold 77 is a tube for fuel intake, the manifold 78 is an air exhaust tube and the manifold 79 is a fuel exhaust tube. Or the manifold 77 is a tube for air intake, the manifold 76 is a tube for fuel intake, the manifold 79 is an air exhaust tube and the manifold 78 is a fuel exhaust tube.

Figure 14:
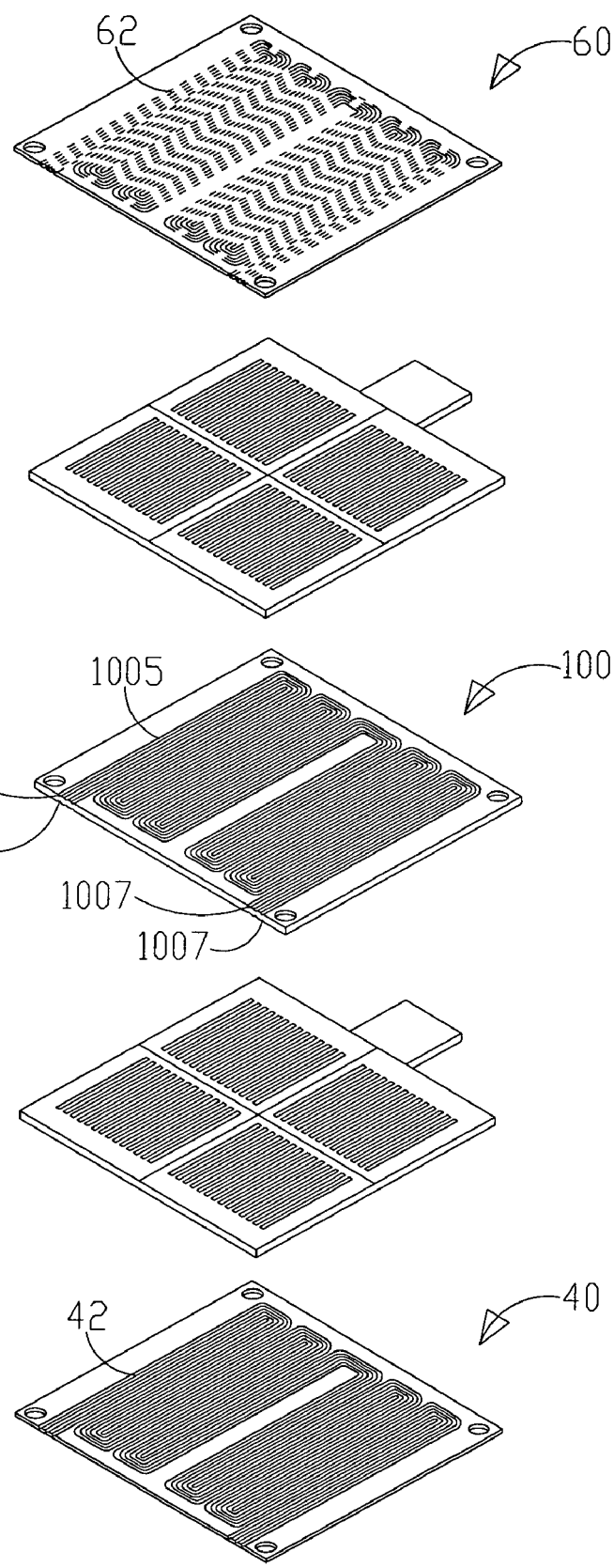
FIG. 14 is an explosive view showing a structure of fuel cell assembly of a further embodiment according to the present.

Refer to FIG. 14, the difference between this embodiment and the on in FIG. 11 is in that the flow field plate 90 of above embodiment is replaced by a bipolar plate 100. Two sides of the bipolar plate 100 are disposed with at least a flow field 1005, a flow inlet 1006, and a flow outlet 1007. The flow field 1005 connects the flow inlet 1006 with the flow outlet 1007. In this embodiment, the flow fields 42, 62, 1005 are serpentine flow fields with rectangular turning area. They can also be in other forms. Moreover, the difference of this embodiment and the above one is in that one side of the bipolar plate 100 is for fuel intake while the other side thereof is for air or oxygen intake. Or both two sides of the bipolar plate 100 are for fuel, air or oxygen intake. For example, if oxygen and air are in from bottom of the bipolar plate 100 and the fuel is in from top of the bipolar plate 100, the flow channel plate 40 is for fuel intake and the flow channel plate 60 is for oxygen or air intake. That's equal to two fuel cells connected in series. If both sides of the bipolar plate 100 are for fuel intake, the flow channel plate 40, 60 are for air or oxygen intake. This is equal to two fuel cells connected in parallel.

In summary, a structure of fuel cell assembly according to the present invention includes a first flow channel plate, a second flow channel plate and a fuel cell set sandwiched between the two flow channel plates. Or the present invention further consists of a first fuel cell set and a second fuel cell set. A flow field plate is disposed between the first fuel cell set and the second fuel cell set. Or a bipolar plate is disposed between the first fuel cell set and the second fuel cell set. By the flow channel plate, water generated from reaction of the fuel cell is removed so as to avoid reaction sites covered by the water as well as reduction of the performance of the cell Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A structure of fuel cell assembly comprising a first flow channel plate disposed with a plurality of flow fields, a flow inlet and a flow outlet; the flow field connects the flow inlet with the flow outlet;
   a fuel cell set arranged over the first flow channel plate and having at least one graphic electrode having plurality of flow fields on two sides thereof respectively;
   a second flow channel plate disposed over the fuel cell set and having a plurality of flow fields, a flow inlet and a flow outlet; the flow field connects the flow inlet with the flow outlet;
   wherein shape of the flow fields of the flow channel plates matches shape of the flow fields of the graphic electrode.

2. The device as claimed in claim 1, wherein the flow field is pin-type flow field, serpentine flow field, or combination of above flow fields.

3. The device as claimed in claim 1, wherein the structure of fuel cell assembly further comprising a plurality of flow pipes that are disposed on the flow inlet and the flow outlet.

4. The device as claimed in claim 3, wherein the structure of fuel cell assembly further comprising a fan connected with the flow pipe.

5. The device as claimed in claim 3, wherein the structure of fuel cell assembly further comprising a pump connected with the flow pipe.

6. The device as claimed in claim 3, wherein the structure of fuel cell assembly further comprising a blower connected with the flow pipe.

7. A structure of fuel cell assembly comprising a first flow channel plate disposed with a plurality of flow fields, a flow inlet and a flow outlet; the flow field connects the flow inlet with the flow outlet;
   a first fuel cell set arranged over the first flow channel plate and having at least one graphic electrode having plurality of flow fields on two sides thereof respectively;
   a flow field plate disposed over the first fuel cell set and having an inlet and an outlet; a flow field is arranged on each of two sides of the flow field plate and the flow field connects the inlet with the outlet;
   a second fuel cell set arranged over the flow field plate and having at least one graphic electrode having plurality of flow fields on two sides thereof respectively; and a second flow channel plate disposed over the fuel cell set and having a plurality of flow fields, a flow inlet and a flow outlet; the flow field connects the flow inlet with the flow outlet;

wherein shape of the flow fields of the flow channel plates matches shape of the flow fields of the graphic electrodes.

8. The device as claimed in claim 7, wherein the flow field is pin-type flow field, serpentine flow field, or combination of above flow fields.

9. The device as claimed in claim 7, wherein the structure of fuel cell assembly further comprising a plurality of flow pipes that are disposed on the inlet and the outlet.

10. The device as claimed in claim 9, wherein the structure of fuel cell assembly further comprising a fan connected with the flow pipe.

11. The device as claimed in claim 9, wherein the structure of fuel cell assembly further comprising a pump connected with the flow pipe.

12. The device as claimed in claim 9, wherein the structure of fuel cell assembly further comprising a blower connected with the flow pipe.

13. The device as claimed in claim 7, wherein the structure of fuel cell assembly further comprising a plurality of flow pipes that are disposed on the flow inlet and the flow outlet.

14. The device as claimed in claim 13, wherein the structure of fuel cell assembly further comprising a fan connected with the flow pipe.

15. The device as claimed in claim 13, wherein the structure of fuel cell assembly further comprising a pump connected with the flow pipe.

16. The device as claimed in claim 13, wherein the structure of fuel cell assembly further comprising a blower connected with the flow pipe.

* * * * *